Sept. 12, 1950 W. O. HARTUP 2,521,974
SHEET METAL MACHINE
Filed Nov. 9, 1946 2 Sheets-Sheet 1
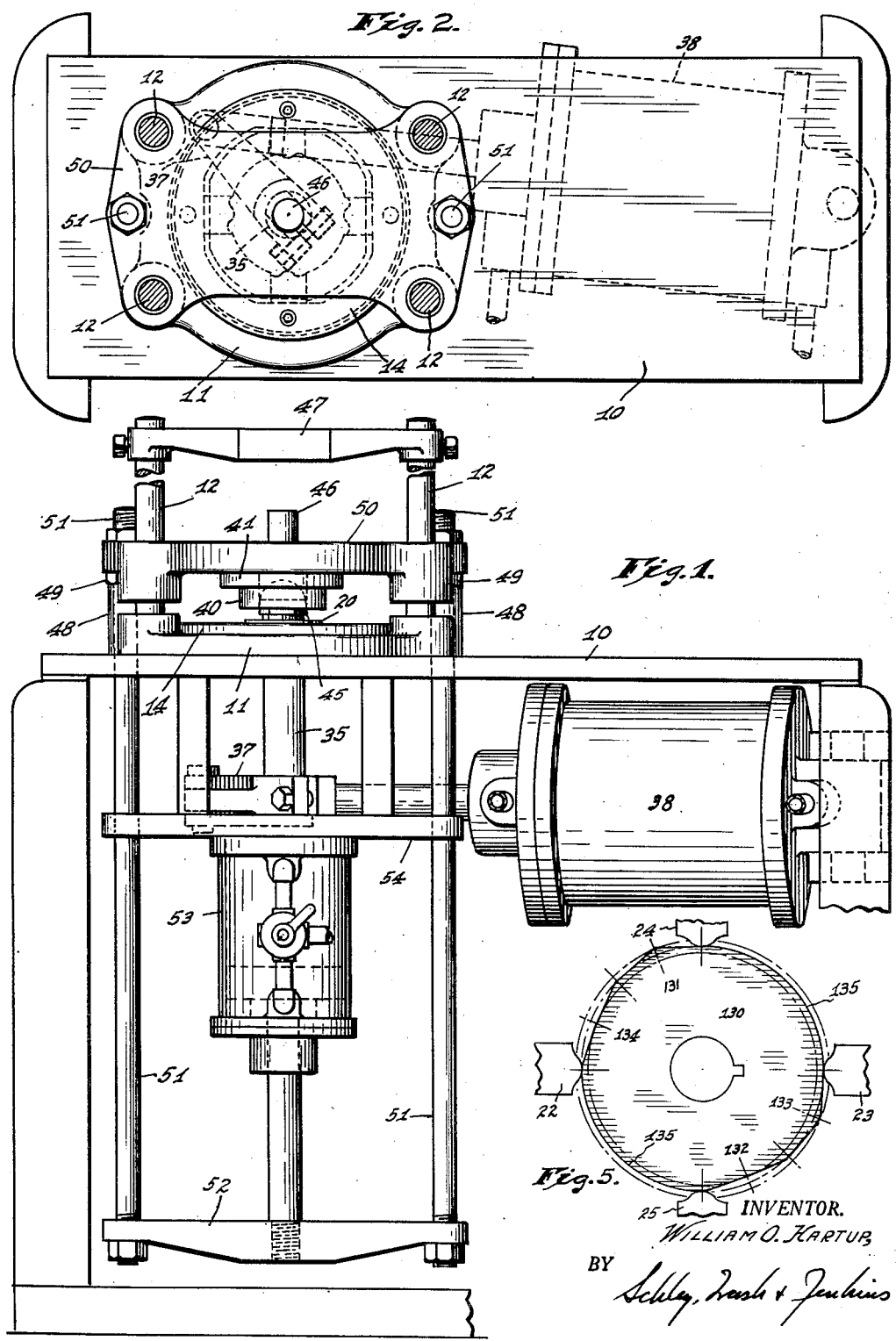
INVENTOR.
WILLIAM O. HARTUP
BY
Schley, Nash & Jenkins
ATTORNEYS.

Sept. 12, 1950 W. O. HARTUP 2,521,974
SHEET METAL MACHINE
Filed Nov. 9, 1946 2 Sheets-Sheet 2
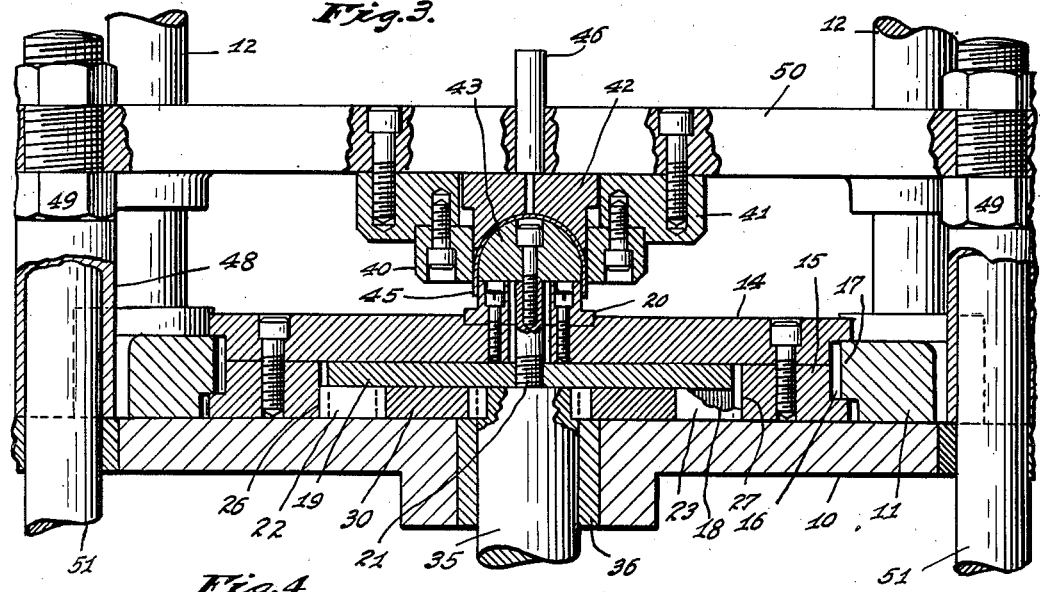
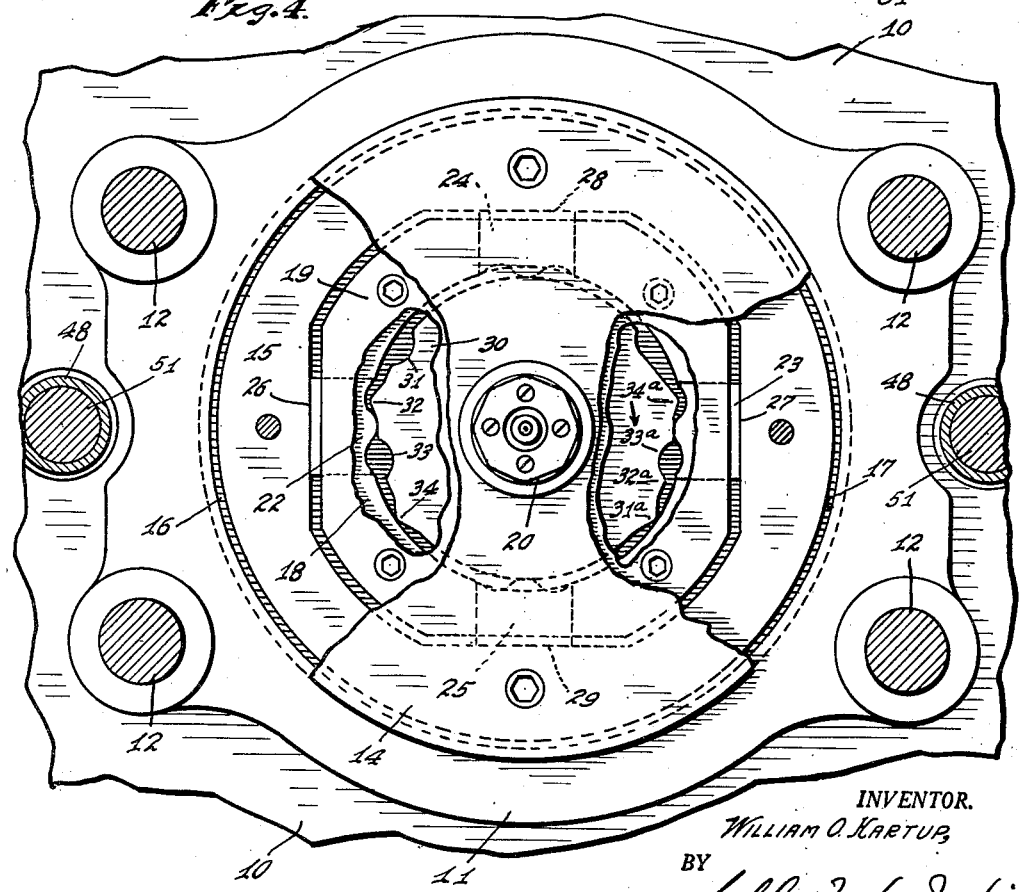
INVENTOR.
WILLIAM O. HARTUP,
BY
Schley, Nash & Jenkins
ATTORNEYS.

Patented Sept. 12, 1950

2,521,974

UNITED STATES PATENT OFFICE 2,521,974

SHEET METAL MACHINE

William O. Hartup, Columbus, Ind.

Application November 9, 1946, Serial No. 709,055

15 Claims. (Cl. 164—47)

This invention relates to a machine for operating upon sheet-metal stampings, especially for trimming the walls of drawn parts.

It is my general object to produce a machine for this purpose which will be self contained, simple in construction and operation, and efficient in performing its work.

Many sheet-metal parts, after being drawn or formed to their desired shape, then have their walls trimmed to provide edges of a desired contour, which may be a continuous edge in a flat or curved plane, or may include notches or upstanding tabs. Supplementary cutting and forming operations may also be done at or adjacent the trimmed edge, by providing the trimming dies with suitable parts for this purpose.

It is now common practice to do this work in a press, by means of a special die mechanism which carries a pair of trimming dies vertically past cams which cause relative horizontal movement between the dies. Such special mechanism is relatively expensive, and requires the time and use of a still more expensive press. The system is inherently inefficient, in that it utilizes an expensive press designed to work in a vertical direction, to perform an operation in which the requirements for vertical work are substantially only to hold parts in relative position, and in which the productive operations are performed by horizontal movement of parts. Moreover, in such a system, productive work can be done only during one stroke of the press, and an idle return stroke is unavoidable.

In providing a self contained machine it is in part my object to avoid the necessity of using the time of a highly expensive press. It is my further object to provide a machine which will be productive on each stroke, without an idle return stroke, which will lend itself to automatic feeding, which will effectively break the trim scrap to make it easily removable, which will require a minimum of power, and which will be sufficiently simple in construction that it will be not substantially more expensive than the special mechanism now used in the even more expensive presses.

In accordance with my invention I mount a laterally movable die plate slidably upon a table, mount one die of a pair of trimming dies on that plate, provide the table with a vertically movable carrier, to hold a complementary die in operative relation with the first and to carry such die away from such relation to open the dies for loading and unloading, and I translate the die plate through an effective sequence of small movements by means of a rotary cam enclosed beneath the die plate. The motion of the die plate may conveniently include four strokes at right angles to each other in a horizontal plane, desirably first in opposite directions along one diameter and then in opposite directions along a diameter at 90° with the first. The cam motion is transmitted outwardly from the cam to the plate through a plurality of pairs of wide plungers which are limited to linear movement and which engage against pairs of parallel inner surfaces on the die plate; and the cam is so formed that during movement of one pair of plungers, another pair is held as guides against its associated pair of parallel surfaces. The cam is desirably operated alternately in opposite directions through strokes of limited angular extent, for example 90°, and may be powered by any desired means, as by an electric motor and gearing, or conveniently by a fluid-operated cylinder directly connected to an arm on the cam shaft. The cam surfaces are so arranged that each stroke of the cam in either direction moves the die plate through a full sequence of its productive motions, so that productive work may be obtained on each such stroke.

In the drawings and in the following description I have illustrated my invention as applied to the trimming of a simple semi-cylindrical cup, such as the bowl of an ice cream dipper. But the invention, and the machine by which it is exemplified herein, are applicable to operation on many different sheet-metal stampings of regular and irregular shape, and may be used for supplemental slitting, punching, and shaping operations by providing the die holders with suitable parts for that purpose.

The accompanying drawings illustrate my invention. In such drawings, Fig. 1 is a side elevation of a machine embodying my invention; Fig. 2 is a plan of the machine shown in Fig. 1; Fig. 3 is a vertical section taken on the axis of the trimming dies; Fig. 4 is a plan taken in the working plane of the dies, and with parts broken away to show the operating parts for the die plate; and Fig. 5 is a plan of a modified cam.

The machine shown in the drawing comprises a table 10 upon which is mounted a bed 11 having vertical guide posts 12 at its corners. A die plate 14 is mounted on the table 10 within the bed 11, and carries the lower trimming die 20.

A cross head 50 is vertically movable on the guide posts 12, and carries the upper trimming die 40. The cross head 50 is connected by vertical rods 51 to a lower cross head 52, and this is connected to be raised and lowered by a power cylinder 53 supported on a frame member 54 spaced below the table 10.

The die plate 14 is a simple disk with a rabbet groove in its lower outer edge. It is secured against the upper surface of a ring 15 as by means of countersunk studs, and the ring 15 rests slidably on the surface of the table 10. The ring 15 is provided with a rabbet groove complementary with that of the die plate 14 to form an annular groove 16 in the periphery of the assembly. A flange 17 on the bed 11 enters the annular groove 16 to hold the die plate 14 and ring 15 against the table 10 but to allow limited translation of the die plate 14 across the surface of the table 10.

A plunger retainer 18 is mounted on the table 10, within the ring 15, and such retainer 18 supports a bridge plate 19. The die plate 14 and the lower die 20 are provided with aligned openings through which work holder supports are supported from the bridge plate 19. With the relatively small dies shown, the work holder support is centrally located and comprises a post 21 threaded into the bridge plate 19.

The plunger retainer 18 is formed to provide radial guide openings for two pairs of plungers 22—23 and 24—25. The retainer 18 limits such plungers to linear movement on diameters normal to each other. As shown in Fig. 4, the plungers 22 and 23 are movable to the right and left, and the plungers 24—25 are movable forward and backward. Each pair of plungers engages against a pair of opposed, parallel, thrust-receiving surfaces formed on the inside of the die-plate supporting ring 15. Thus, the pair of plungers 22 and 23 engage respectively parallel surfaces 26 and 27, and the plungers 24 and 25 engage respectively parallel surfaces 28 and 29.

A cam 30 lies within the ring of the plunger-retainer 18, between the table 10 and the bridge member 19; and engages the inner rounded ends of the several plungers. In the position shown in Fig. 4, the front and back quadrants of the cam 30, shown in engagement with the plungers 24 and 25, are of circular contour. The right and left quadrants of the cam 30 are formed with a series of cam elements. Proceeding in a counter-clockwise direction across the left-hand quadrant shown in Fig. 4, such cam elements comprise a low 31, a rise 32, a low 33, and a rise 34, in that order. The opposite quadrant has a corresponding series of cam elements 31a—34a complementary with the cam elements 31—34.

The cam 30 is fixed on the upper end of a cam shaft 35 which extends downwardly through a bearing 36 in the table 10 and is journaled at its lower end in the frame member 54. Near its lower end, the cam shaft 35 carries a radial arm 37 by which the cam may be reciprocated through strokes of 90° by a power cylinder 38.

Trimming dies suitable for use on the machine may be of usual form, designed to be moved laterally with respect to each other with their cutting edges in shearing relationship. Desirably, and as shown, the inner die 20 of the pair is mounted on the die plate 14, below its complementary outer die 40; and the outer die 40 is mounted on the cross head 50 to be carried into and out of operative relation with its mate 20 by vertical movement of the cross-head 50.

The upper die 40 is mounted on the cross head 50 by an annular die holder 41, having a central opening coaxial with that of the die 40. Within the central openings of the die 40 and holder 41, there is an upper work-holder 42 which has limited vertical movement therein. Conveniently, the opening of the die holder 41 is larger than that of the die 40, so that the die 40 forms a shoulder at the lower end of the opening of the die holder 41, and the work-holder 42 has a shoulder which engages the die 40 to retain the work-holder 42 therein.

The work holder 42 is shaped to conform to the upper surface of the work 45, here shown as a simple semi-cylindrical cup. A complementary work holder 43, conforming to the inner contour of the work 45, is mounted on the work-holder support 21 in sliding engagement with the upper surface of the lower die 20.

The downward stroke of the cross head 50 is desirably limited by one or more stops. Conveniently, such stops may be provided by sleeves 48 loosely received on the cross-head draw rods 51 and resting on the table 10. Such sleeves are provided of the proper height to engage the nuts 49 on the rods 51 at a point which places the dies 20 and 40 in proper shearing relationship.

Operation of the machine is conveniently by the fluid operated cylinders as shown. In such case, the cam is moved through strokes of 90° alternately clockwise and counter-clockwise.

The normal rest position of the cam 30 may be that shown in Fig. 4, or turned 90° therefrom. In either such case all plungers 22—25 will engage the cam 30 on lands equidistant from its axis, and the die plate will be centered to hold the die 20 in vertical alignment with the upper die 40.

To insert the work, the lower power cylinder 53 is operated to raise the cross head 50, which elevates the upper die 40 out of cooperation with the lower die 20, and gives clearance for placing a work piece 45 over the work holder 43 and lower die 20. The lower power cylinder 53 is then operated to lower the cross head against the stops 48. This brings the upper die 40 into working relationship with the lower die 20, for shearing the edges of the work, and brings the upper work holder 43 against the work 45, to hold it firmly in proper position on the lower work holder 42.

The power cylinder 38 is now operated to rotate the cam through a stroke of 90°, during which the cam operates upon the plunger 22—25 to force the die plate through a sequence of motions first oppositely along one diameter and then oppositely along a diameter 90° thereto.

The stroke of the cam 30 may be in either direction from the position shown in Fig. 4. Assuming a clockwise stroke, the cam elements operate the plungers as follows: The rise 33a forces the plunger 23 outwardly while simultaneously the plunger 22 is permitted to retract by entering the low 42; the cam then returns the plungers 22 and 23 to their central position. Next, the rise 34 engages the plunger 22 to force it outwardly, while simultaneously the plunger 23 is permitted to retract by entering the low 34a, and the plungers are then returned to centered position. During all of this movement, the plungers 24 and 25 are held stationary, in engagement with their thrust receiving surfaces 28 and 29, so that they act as stationary guides to limit movement of the ring 15 parallel to those surfaces 28 and 29 and in the direction of movement of the plungers 22 and 23.

The cam 30 has now moved through 45°, or half its stroke. At this point, the rise 31a is approaching the plunger 25 and the low 31 is approaching the plunger 24, while the plungers 22 and 23 have reached the concentric quadrants of the cam 30. As the cam 30 proceeds, the rise 31a moves the plunger 25 outwardly while simultaneously the low 31 permits retraction of the plunger 24. The rise 32 then engages the plunger 24 to move it outwardly, while simultaneously the low 32a permits the plunger 25 to retract. The cam stroke ends with the plungers 24 and 25 in engagement with the flats shown in Fig. 4 in engagement with the plungers 22 and 23. During this last half of the stroke, the plungers 22 and 23 ride on the concentric surfaces of the cam, and are held stationary as guides against their thrust receiving surfaces 26 and 27, to limit the die plate 14 to movement parallel with those surfaces 26 and 27.

This cam operation moves the die plate 14 and the lower die 20 first to the right, then to the left, then to a centered position, then forward, then backward, and then to a centered position. Such movement produces a shearing action between the dies 20 and 40, first to shear the left side of the work 45, then the right side, then the front side, and then the back side, which completes a full trimming operation.

With the cam remaining in the position in which this stroke leaves it, the power cylinder 53 is operated to raise the cross head, and separate the dies. The work 45 will be carried with the die 40, and as the cross head 50 approaches the upper limit of its rise, a knock-out bar 46 slidably received in an opening in that cross head 50 will engage a cross member 47 fixed on the upper ends of the guide posts 12, and will be moved relatively downward through the cross head 50 to force the upper work holder 42 downwardly to eject the work 45 from the die 40.

Desirably, the lower die 20 is not shaped to exactly fit the inside of the work 45, but is provided with axially extending ridges. Thus, for example, with a piece such as that shown in the drawings where the edges to be trimmed are generally cylindrical, the lower die is of octagonal shape, to provide corners in each of the directions which that die moves. I have found that this facilitates the shearing action of the dies, especially during the initial cuts in the four directions of die movement and that normally it will not only remove the trim, but will split or break the trim so that it can be readily removed from the surface of the die plate, as by a blast of compressed air.

With the first piece and its trim removed from the machine, a new piece is inserted, the cross head 50 lowered to bring the dies into operative relationship and the cam 30 moved through a second stroke. Conveniently, this may be a return stroke, in the opposite direction from that used to trim the first piece. In this return stroke, the engagement of the cam elements with the plungers 23—25 will be in reverse sequence from that occurring during the forward stroke, so that the die plate and the lower die 20 will be moved first backward, then forward, then to the left, then to the right. This reverse sequence of operations is fully as effective and productive as the opposite sequence on the first piece. In each sequence, the die plate is moved first in opposite directions along one diameter and then in opposite directions along a diameter at right angles to the first.

The cam used in the machine may have other arrangements of cam-elements than the elements 31—34 and 31a—34a on the cam 30. For example, the cam may have fewer sets of cam elements, and may be positioned to operate the same plungers in different sequential orders, and may be operated in successive strokes which are always in the same direction rather than alternately in opposite directions.

A cam 130 with two sets of cam elements is shown in Fig. 5, with fragmental portions of the plungers 22—25 shown in relative positions therewith. Assuming clockwise rotation of the cam 130, the rise 131 and its complementary low 132 first move the pair of plungers 24—25 back (upward in Fig. 5), then the rise 133 and low 134 move the same pair of plungers forward. Meanwhile, the concentric surfaces 135 hold the plungers 22—23 stationary to serve as guides against their thrust-receiving faces. The cam elements 131—134 then operate the pair of plungers 22—23 in corresponding manner, to move them first to the right, then to the left. This 180° stroke completes a full operative sequence of die plate movements. The next subsequent stroke may be either in a counter-clockwise direction, reverse to the first stroke, or may be clockwise, in the same direction as the first stroke.

The machine may be loaded and unloaded manually, and its two power cylinders 53 and 38 may be operated by manual controls. But the machine readily adapts itself to automatic loading and unloading, and whether the loading operations are manual or automatic, the power cylinders 53 and 38 may be operated by interlocking or automatic controls. Such cylinders may be operated hydraulically, or conveniently by compressed air, and may be replaced with other power mechanism if desired. The dies 20 and 40 may be readily replaced with other dies for trimming other work than the simple cup shown in the drawings. Such other dies may be either smaller than those shown, or may be much larger up to the limit of the area of the die plate. As desired, the die plate 14 itself may readily be removed, merely by release of the studs which hold it against its supporting ring 15, and without disturbing other operative parts of the machine. The dies used in the machine may be trimming dies, or dies which both trim and slit or punch edge portions of the work, and any such dies may be provided with means to do minor forming operations on the work, in accordance with known practice, but with substantially greater liberty than in prior machines. The machine is inherently quiet and smooth in operation, so that its parts and dies used with it are subjected to minimum wear.

I claim as my invention:

1. A machine for operating upon the walls of sheet-metal stampings, comprising a cam shaft, a cam on said shaft having circumferential cam elements, a plurality of pairs of thrust members in diametrically opposite engagement with said cam, a die plate having a die-receiving face normal to the axis of said cam shaft and generally concentric therewith, a pair of diametrically opposite thrust receiving faces carried by said die plate in opposition respectively to the thrust members of each pair thereof, said cam being shaped to cause thrust movement of the thrust members of each pair successively in diametrically opposite directions and simultaneously to hold another pair of thrust members stationary in sliding engagement with their associated thrust-receiving faces to guide the die plate in linear movement, means to rotate said cam shaft to cause said cam to movably engage pairs of thrust members successively, a complementary-die support separately movable axially of said cam shaft between open- and closed-die positions, 2. A machine for operating upon the walls of a sheet-metal stamping, comprising a cam shaft, a cam on said shaft having circumferential cam elements, a plurality of thrust members in radial engagement with said cam, a die plate having a die-receiving face normal to the axis of said cam shaft and generally concentric therewith, thrust receiving faces for said die plate respectively positioned to receive the thrust of said thrust members, said cam being shaped to cause thrust movement of said thrust members to move said die plate, means to rotate said cam shaft to cause said cam to movably engage said thrust members, and a complementary-die support separately movable axially of said cam shaft between open- and closed-die positions.

3. A machine for operating upon the walls of sheet-metal stampings, comprising a cam shaft, a cam on said shaft having circumferential cam elements, a plurality of pairs of thrust members in diametrically opposite engagement with said cam, a die plate having a die-receiving face normal to the axis of said cam shaft and generally concentric therewith, a pair of diametrically opposite thrust receiving faces carried by said die plate in opposition respectively to the thrust members of each pair thereof.

4. A machine for operating upon the walls of sheet-metal stampings, comprising a cam shaft, a disk cam thereon, a die-receiving plate parallel with said cam, two pairs of diametrically opposite thrust members in radial engagement with said cam, two pairs of parallel faces perpendicular to said die plate in thrust-receiving engagement with said thrust members and normal to their thrust lines, the thrust-line of each pair of thrust members being parallel with the thrust-receiving faces of the other pair of thrust members, said cam being formed to operate a pair of thrust-members while simultaneously holding the other pair of thrust-members stationary as guides against its associated thrust-receiving faces, and means to rotate said cam.

5. A machine for operating upon the walls of sheet-metal stampings, comprising a cam shaft, a disk cam thereon, a die-receiving plate parallel with said cam, a plurality of thrust-members in radial engagement with said cam, a face on said die plate in thrust receiving engagement with each thrust member, said cam being formed to operate each thrust member and simultaneously to cause other thrust members to guide said die-plate for movement by the cam-operated thrust member.

6. A machine for operating upon the walls of sheet-metal stampings, comprising a support, a movable die plate, a complementary-die holder, inwardly facing thrust-receiving faces on said die plate and perpendicular thereto, and thrust members radially movable outwardly against said faces, and cam means operatively engaging said thrust-members to cause radial movements of said die plate.

7. A machine for operating upon the walls of sheet-metal stampings, comprising a table, a die-plate supporting ring slidably received on said table, a die plate on said ring, thrust members radially movable outward against said ring, and cam means operatively engaging said thrust members to cause radial movements of said die plate.

8. A machine for operating upon the walls of a sheet-metal stamping, a table, a die plate having depending walls slidably supported on said table, a cam shaft journaled in said table generally concentric with said die plate and between the walls thereof, a cam on said cam shaft having circumferential cam elements, the supporting walls of said die plate presenting opposed pairs of parallel thrust-receiving surfaces facing said cam on opposite sides thereof, thrust members between said cam and each of said cam surfaces, said thrust members being disposed radially between said surfaces and said cam, means to limit said thrust members to radial movement, said cam being shaped to cause radial movement of a pair of diametrically opposite thrust members alternately in opposite directions and simultaneously to hold stationary a second pair of diametrically opposite thrust members at right angles to the first pair, whereby said moving thrust members cause movement of the die plate parallel to themelves and said stationary pair of thrust members guide said die plate in such movement, and means to rotate said cam into operative engagement with successive pairs of thrust members.

9. A machine as set forth in claim 1 with the addition of a stationary bridge member between said cam and die plate, said die plate having an opening, and means on said bridge member to support a work locator within said die plate opening.

10. A machine for operating upon the walls of sheet-metal stampings, comprising a table, a die-plate supporting ring slidably received on said table, a die plate on said ring, thrust members and a disk cam positioned within said ring between the die plate and the table, said cam and members being operable to cause radial movements of said die plate, a stationary bridge member between said cam and die plate, said die plate having an opening, and means on said bridge member to support a work locator within said die plate opening.

11. A machine for operating upon the walls of a sheet-metal stamping, comprising a movable die plate, two pairs of parallel thrust-receiving faces beneath said die plate, said pairs being perpendicular to each other, a cam shaft normal to said die plate, a cam on said cam shaft having circumferential cam elements, radial thrust members between said cam and each of said thrust-receiving faces to limit said thrust members to radial movement, said cam having opposite quadrants formed to cause radial movement of said thrust members and intervening quadrants formed to present concentric thrust-member engaging surfaces, said opposite thrust-member-moving quadrants being formed with complementary cam elements to move a pair of diametric thrust members consecutively in opposite directions along their diameter, and means to rotate said cam to carry said opposite quadrants first into operative engagement with one opposed pair of thrust members and then into engagement with the other opposed pair of thrust members, the concentric surfaces of said cam being positioned to hold a pair of thrust members stationary against its associated thrust receiving surfaces to guide said ring in a direction normal to the movement of such pair of thrust members.

12. A machine for operating upon the walls of a sheet-metal stamping, comprising a movable die plate, two pairs of parallel thrust-receiving faces beneath said die plate, said pairs being perpendicular to each other, a cam shaft normal to said die plate, a cam on said cam shaft having circumferential cam elements, radial thrust members between said cam and each of said thrust-receiving faces to limit said thrust members to radial movement, said cam having opposite quadrants formed to cause radial movement of said thrust members and intervening quadrants formed to present concentric thrust-member engaging surfaces, said opposite thrust-member-moving quadrants being formed with complementary cam elements to move a pair of diametric thrust members consecutively in opposite directions along their diameter, means to rotate said cam to carry said opposite quadrants first into operative engagement with one opposed pair of thrust members and then into engagement with the other opposed pair of thrust members, the concentric surfaces of said cam being positioned to hold a pair of thrust members stationary against its associated thrust receiving surfaces to guide said ring in a direction normal to the movement of such pair of thrust members, a stationary bridge member underlying said die plate between its thrust-receiving faces, said die plate being provided with an opening, and a work-locator support on said bridge member within the opening of said die plate.

13. A machine for operating upon the walls of a sheet-metal stamping, comprising a movable die plate, two pairs of parallel thrust-receiving faces beneath said die plate, said pairs being perpendicular to each other, a cam shaft normal to said die plate, a cam on said cam shaft having circumferential cam elements, radial thrust members between said cam and each of said thrust-receiving faces to limit said thrust members to radial movement, said cam having opposite quadrants formed to cause radial movement of said thrust members and intervening quadrants formed to present concentric thrust-member engaging surfaces, said opposite thrust-member-moving quadrants being formed with complementary cam elements to move a pair of diametric thrust members consecutively in opposite directions along their diameter, means to rotate said cam to carry said opposite quadrants first into operative engagement with one opposed pair of thrust members and then into engagement with the other opposed pair of thrust members, the concentric surfaces of said cam being positioned to hold a pair of thrust members stationary against its associated thrust receiving surfaces to guide said ring in a direction normal to the movement of such pair of thrust members, a stationary bridge member underlying said die plate between its thrust-receiving faces, said die plate being provided with an opening, and a work-locator support on said bridge member within the opening of said die plate, said die plate being adapted to receive the inside die of a pair of trimming dies, a die carrier vertically movable with respect to said table above said die plate, an annular die support on said carrier and provided with a central opening to receive an upper work locator.

14. A machine for operating upon the walls of sheet-metal stampings, comprising a support, a die plate movable horizontally over said support and provided with a central opening, the die plate being adapted to receive an inner trimming-die about said opening, a holder fixed on said support to support through said opening a work-locator for said trimming die, an outer-die carrier movable toward and from said die plate, means on said carrier to support an upper work-holder for relative movement within an outer-die on said carrier, and stop means engaged during movement of said carrier to open-die position to prevent movement of said work-holder with said carrier, whereby the movement of the carrier relative to the work holder causes ejection of work held by the upper die.

15. A machine for operating upon the walls of a sheet-metal stamping, a lower-die plate, means supporting said plate for limited translation movement, said die plate having depending outer walls, an upper-die carrier vertically movable to bring an upper die thereon into operative relationship with a die on said lower-die plate, means to move said upper die carrier between said position and a loading position, and cam means within the depending walls of said die plate for moving said die plate in a plane normal to the movement of said upper die carrier.

WILLIAM O. HARTUP.

REFERENCES CITED

The following references are of record in the file of this patent:

UNITED STATES PATENTS

| Number | Name | Date |
|---|---|---|
| 2,125,269 | Buff | Aug. 2, 1938 |